US005232195A

United States Patent [19]

Torrielli

[11] Patent Number: 5,232,195

[45] Date of Patent: Aug. 3, 1993

[54] FLOW REGULATING VALVE

[75] Inventor: Vittorino Torrielli, Turin, Italy

[73] Assignee: Fiat Auto S.p.A., Turin, Italy

[21] Appl. No.: 845,242

[22] Filed: Mar. 3, 1992

[30] Foreign Application Priority Data

Mar. 8, 1991 [IT] Italy ........................ T091A 000 165

[51] Int. Cl.[5] ............................................ F16K 31/06

[52] U.S. Cl. ............................. 251/129.08; 251/122; 251/903

[58] Field of Search ................... 251/129.08, 903, 122

[56] References Cited

U.S. PATENT DOCUMENTS 3,870,931 3/1975 Myers .
3,914,952 10/1975 Barbier ....................... 251/129.08 X
3,970,981 7/1976 Coors .
4,429,708 2/1984 Strueh ........................ 251/129.08 X
4,791,958 12/1988 Brundage .................. 251/129.08 X
4,966,195 10/1990 McCabe ..................... 251/129.08 X
5,046,702 9/1991 Miyazawa et al. ........ 251/129.08 X

FOREIGN PATENT DOCUMENTS 204293 12/1986 European Pat. Off. .
0015167 1/1982 Japan ............................ 251/129.08

*Primary Examiner*—Arnold Rosenthal
*Attorney, Agent, or Firm*—Ladas & Parry

[57] ABSTRACT

A flow regulating valve incorporating a core of ferromagnetic material, a spring which repositions the core, an electromagnet which in turn comprises at least one coil wound onto a magnetic yoke, in which the yoke has an internal cavity in which the core is located so that it can move in an axial direction and a hydraulic circuit controlled by a needle obstructor integrally mounted on the core, is described. The valve is of a shape such that the magnetic reluctance of a magnetic circuit comprising the yoke, the electromagnet and the core is maintained substantially almost constant as the relative axial position between the core and the yoke changes, and, in combination, the spring is housed so as to bear against an axial shoulder in the cavity and one end of the core so that in use it exerts a return force against the core, the change in which resulting from relative displacement between the yoke and the core is greater than the change in the attractive force exerted on the core by the electromagnet as a result of that displacement.

13 Claims, 1 Drawing Sheet

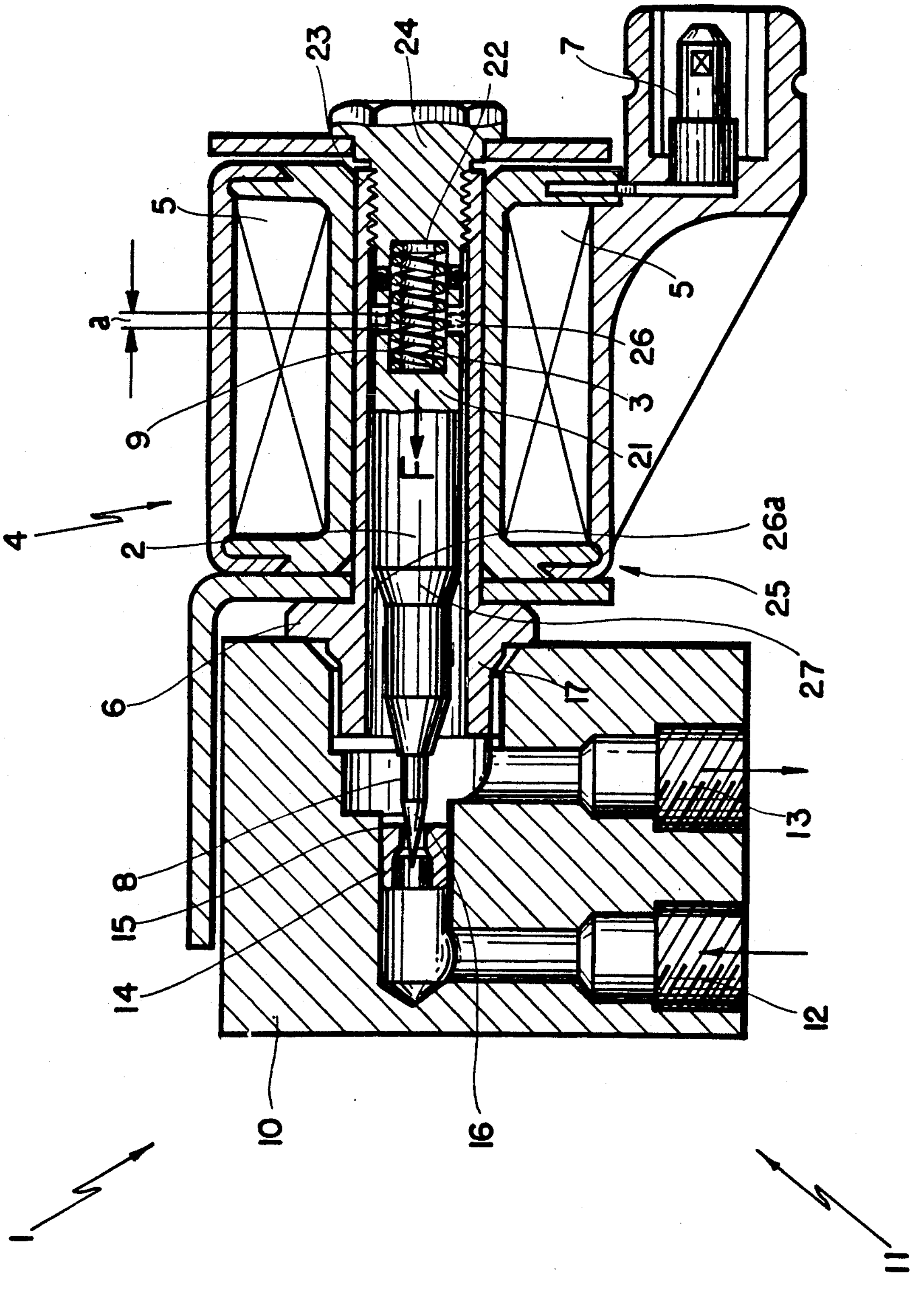
23
24
22
7
5
5
a
26
9
3
21
F
4
2
26a
25
27
6
17
13
8
15
14
12
10
16
1
11

FLOW REGULATING VALVE

BACKGROUND OF THE INVENTION

This invention relates to a valve for regulating the flow of a fluid, in particular a variable-flow two-way valve for use in controlling actuators in an electronically controlled servo-mechanism.

It is known that, particularly in power braking and power steering hydraulic control circuits, electromagnetic valves have to be provided in order to control the flow of fluid circulating in the hydraulic circuit. It is known that proportional valves can be used for this purpose, and by means of these a fairly strict relationship can be achieved between the change in the flow of fluid in the circuit and the change in the electrical supply voltage or current to the valve. However these valves have some disadvantages, including the fact that they are rather expensive and allow fluid to pass when in the closed position.

Valves of the "on-off" type which are less expensive than the above, which are perfectly fluid-tight when the valve is closed, but with which continuous regulating of the flow is not possible, are also known.

SUMMARY OF THE INVENTION

The object of the invention is to provide an electromagnetically operated valve for a hydraulic circuit, in particular for the control of servo-mechanisms, such that the flow of the fluid circulating in the circuit for part thereof can be regulated continuously within a certain range, which is economical to manufacture and which results in zero flow when the valve is closed, without seepage.

The abovementioned object is accomplished by the invention, which relates to a flow regulating valve of the type comprising a movable core of ferromagnetic material, elastic opposing means acting together with the core, an electromagnet which in turn comprises a magnetic yoke and at least one coil wound about the said yoke, which has within itself a cavity, ending at one end in an axial shoulder, in which the said core is housed such that it can move in an axial direction, and a hydraulic circuit comprising obstructing means integrally mounted on the said core, characterised in that the said core is such as to maintain the magnetic reluctance of a magnetic circuit comprising the said yoke, the said electromagnet and the said core substantially almost constant as the relative axial position between the core and the yoke varies. The said elastic means are capable of exerting an opposing force against the said core, the change in which, following a relative axial displacement between the yoke and the core, is greater than the change in the force of attraction exerted on the said core by the said electromagnet as a result of the displacement.

BRIEF DESCRIPTION OF THE DRAWING

For a better understanding of the invention a non-restrictive description of an embodiment will now be given with reference to the appended drawing in which a view of a flow regulating valve according to the invention is illustrated mostly in lateral cross-section.

DETAILED DESCRIPTION OF THE INVENTION

With reference to the FIGURE, 1 indicates an on-off, needle type valve, which is, however, flow regulating valve (i.e. throttling or metering). It has a movable core 2 of ferromagnetic material of cylindrical shape, a helicoidal spring 3, of predetermined stiffness, coaxial with the ferromagnetic core 2 and acting together therewith in order to oppose its movement in predetermined direction, and an electromagnet 4 in turn comprising a coil 5 wound about a magnetic yoke 6 and connected by means of connectors 7 to an electronic supply nd control device which is known and for the sake of simplicity is not illustrated. Valve 1 also comprises a hydraulic circuit 11 provided within body 10 thereof and comprising an inlet pipe connection 12, an outlet pipe connection 13 and a bush 14 placed between pipe connections 12, 13 in which is provided a calibrated orifice 15 so as to allow fluid to pass from pipe connection 12 to 13. In accordance with the invention magnetic core 3 has integral therewith at one end 8 a needle obstructor 16 of the triangular type which when in use can wholly or partly obstruct aperture 15.

Yoke 6, which is of a tubular cylindrical shape, projects laterally forming an overhang from electromagnet 4 by means of one end 17 which makes a fluid-tight joint with body 10 and has within itself a cavity 21 in which are housed spring 3 and core 2 which can move in an axial direction in cavity 21 and projects therefrom with an overhang by means of its end 8 within body 5 when obstructor 16 is in a closed position, which is not illustrated, and in which it is wholly displaced towards the left, abutting against bush 14, in contrast to that illustrated in the FIGURE, where it completely obstructs aperture 15. Spring 3 is mounted coaxially with core 2 and cavity 21 itself and acts by bearing against axial shoulder 22 of cavity 21 and one end 9 of core 2.

One end 23 of yoke 6 is threaded internally, while shoulder 22 is defined by the inner face of a plug 24 screwed into end 23 of yoke 6 in such a way that spring 3 can be preloaded to any desired value.

Core 2 forms part of a magnetic circuit, indicated as a whole by 25, which in addition to core 2 comprises electromagnet 4, yoke 6, an air gap 26 defined by the axial play between core 2 and plug 24 which determines the maximum distance available for movement by core 2, and an air gap 26*a* defined by the radial play between yoke 6 and a portion 27 of core 2 which when in use faces the part of yoke 6 in which the lines of flux passing through magnetic circuit 25 are closed. According to the invention portion 27 of core 2 does not have a constant diameter, but is instead shaped with a radial profile such as to maintain the magnetic reluctance of magnetic circuit 25 substantially almost constant as the axial position of core 2 changes. In point of fact portion 27 has a substantially frusto-conical shape such that following an axial displacement of core 2 in cavity 21 the change in the clearances of air gaps 26 and 26*a*, which on the basis of what has already been described are both entities which vary as the relative axial position between core 2, yoke 6 and plug 24 varies, is almost inversely proportional, so as to maintain the value of the sum of the values of the two air gaps 26 and 26*a* almost constant.

In particular, as the axial position of core 2 changes, the axial position of portion 27 of reduced diameter will also change as a result of which, through action of electromagnet 4 and the consequent displacement of core 2 to the right, air gap 26 is reduced and air gap 26*a* is increased so as to maintain the overall magnetic reluctance of the circuit virtually constant. It should be noted that the term "virtually constant" is intended to mean a fairly small change in the reluctance (equal to a fraction of a percent of the overall reluctance of circuit 25), but which is nevertheless measurable. In combination with this first feature, spring 3 is designed to have a stiffness such that it can apply an opposite or repelling force against core 2, indicated by F, the change in which following a relative displacement a between yoke 6 and core 2 is always greater than the corresponding change in the attractive force exerted on core 2 by electromagnet 4 as a consequence of the same relative displacement and depends on the fact that through the axial displacement a of core 2 in yoke 6 a change is obtained in both air gap 26 and air gap **26*a* (as a result of the decrease in diameter in portion 27) in such a way that the reduction in air gap 26 is compensated for by the increase in air gap 26*a***, maintaining the reluctance of the system substantially constant.

In use, when electromagnetic 4 is not excited, core 2 is displaced towards the left by spring 3 (which has a predetermined stiffness and is preloaded) into the abovementioned closed position in which needle obstructor 16 completely obstructs calibrated aperture 15 of hydraulic circuit 11 thus ensuring that valve 1 closes and is perfectly fluid-tight.

In accordance with the invention, fluid passes through aperture 15 when an electrical current is passed through coil 5 by the said electronic control device which is not illustrated. This in fact causes coil 5 to generate a magnetic field which closes its own lines of force through core 2 consequently attracting the latter into yoke 6, with a consequent axial displacement of core 2 towards the right, compressing spring 3 and displacing obstructor 16 to the right thus opening aperture 15. The characteristic shape of the core, which results int h magnetic reluctance of magnetic circuit 25 being substantially almost constant as the axial position of core 2 changes within cavity 21, and the opposing force of spring 3, which changes with the change in compression more than the amount by which the attractive force exerted by electromagnet 4 on core 2 varies, bring about, for example after core 2 has travelled a distance a, a condition of equilibrium between the forces acting on core 2 (magnetic attraction and opposing force F) which prevents core 2 from moving to the end of its travel, as instead occurs in known "on-off" valves. This equilibrium position depends on the strength of the magnetic field and therefore the strength of the feed current (and/or voltage) in coil 5. As a result of this core 2 and corresponding obstructor 16 can be located selectively in a plurality of different axial positions with respect to yoke 6, between the closed position and the opposite end of travel position (not illustrated) in which core 2 is fully displaced towards the right abutting against plug 24, appropriately controlling the current or voltage in coil 5 by means of the said electronic control circuit. As a consequence aperture 15 can be throttled in a continuously variable manner, with a consequent continuous variation in the flow of fluid which can pass through valve 1, to a desired value, a value which will depend exclusively, as has been described, on the current supplied to coil 5.

In accordance with a possible embodiment which is not illustrated, without going beyond the scope of the invention, coil 5, instead of being continuously driven by the current or voltage from an electronic control circuit in order to change the strength of the magnetic field generated by it, can be replaced by a plurality of coils alongside each other which can be controlled independently or in combination by a suitable control device, producing a plurality of magnetic fields which all act additively on coil 2 thus making it possible to position coil 2 in a discrete plurality of different axial positions thus obtaining a discrete number of different fluid flows.

The advantages associated with the invention are obvious from what has been described. The flow regulating valve constructed in accordance with the invention makes it possible to obtain a fluid flow which varies with the supply to the electromagnet, and is less costly to manufacture than the proportional valves known hitherto, while at the same time providing an effective seal when the valve is closed, hitherto characteristic only of "on-off" type valves.

Finally it is clear that similar advantages will be obtained by applying the same inventive concept to a valve of the type which is normally open (without excitation) instead of the type which is normally closed, such as the non-restrictive embodiment illustrated and described. Such a valve, fed with an increasing current, would close progressively, to become completely closed when the excitation current exceeds the predetermined value.

I claim:

1. A valve, comprising:

a body having means for fluid flow;

an electromagnet;

throttling means responsive to the electromagnet for variably throttling the means for fluid flow, whereby to variably control the fluid flow; and magnetic reluctance means for defining a substantially constant magnetic reluctance between the electromagnet and the throttling means, whereby the variable throttling response of the latter, and thereby the fluid flow, substantially is proportional to electric drive of the electromagnet;

wherein the magnetic reluctance means comprises first and second air gaps for oppositely and substantially proportionally varying the magnetic reluctance.

2. The valve of claim 1, wherein the means for fluid flow comprises an aperture in the body;

the throttling means comprises a core having one needle end, the electromagnet magnetically moving the core for the needle end to partly obstruct the aperture.

3. The valve of claim 2, wherein the throttling means further comprises means for the electromagnet to magnetically move the core for the needle end to wholly obstruct the aperture.

4. The valve of claim 2, wherein the magnetic reluctance means comprises first and second air gaps for oppositely and substantially proportionally varying the magnetic reluctance.

5. The valve of claim 3, wherein the magnetic reluctance means comprises first and second air gaps for oppositely and substantially proportionally varying the magnetic reluctance.

6. The valve of claim 4, wherein the core defines the air gaps and the first air gaps increases the magnetic reluctance when the core moves in one direction and the second air gap substantially proportionally decreases the magnetic reluctance when the core moves in the one direction.

7. The valve of claim 5, wherein core defines the air gaps and the first air gaps increases the magnetic reluctance when the core moves in one direction and the second air gap substantially proportionally decreases the magnetic reluctance when the core moves in the one direction.

8. The valve of claim 6, wherein the first air gap comprises an opposite end of the core and a yoke having plug axially spaced from the opposite end of the core, whereby the first air gap is axial of the core.

9. The valve of claim 7, wherein the first air gap comprises an opposite end of the core and a yoke having plug axially spaced from the opposite end of the core, whereby the first air gap is axial of the core.

10. The valve of claim 6, wherein the second air gap comprises a conical portion of the core at the one end thereof and a yoke having a cavity that receives the core and from which the one end of the core variably projects in dependence upon the movement of the core, whereby the second air gap is radial of the core.

11. The valve of claim 7, wherein the second air gap comprises a conical portion of the core at the one end thereof and a yoke having a cavity that receives the core and from which the one end of the core variably projects in dependence upon the movement of the core, whereby the second air gap is radial of the core.

12. The valve of claim 8, wherein the second air gap comprises a conical portion of the core at the one end thereof and the yoke having a cavity that receives the core and from which the one end of the core variably projects in dependence upon the movement of the core, whereby the second air gap is radial of the core.

13. The valve of claim 9, wherein the second air gap comprises a conical portion of the core at the one end thereof and the yoke having a cavity that receives the core and from which the one end of the core variably projects in dependence upon the movement of the core, whereby the second air gap is radial of the core.

* * * * *